United States Patent [19]

Landy

[11] 4,023,529

[45] May 17, 1977

[54] LAMINAR FLOW SYSTEM AND REMOVABLE ANIMAL RACK

[76] Inventor: Jerome J. Landy, 13700 SW. 78 Court, Miami, Fla. 33158

[22] Filed: Nov. 17, 1975

[21] Appl. No.: 632,787

[52] U.S. Cl. .................................. 119/15; 119/17
[51] Int. Cl.² ...................................... A01K 1/00
[58] Field of Search ............... 119/15, 17, 21, 30, 119/37, 19

[56] References Cited

UNITED STATES PATENTS

| | | | |
|---|---|---|---|
| 3,557,756 | 1/1971 | Ramsey | 119/15 |
| 3,630,174 | 12/1971 | Runkle et al. | 119/15 |
| 3,892,201 | 7/1975 | Crawford | 119/17 |

Primary Examiner—Hugh R. Chamblee
Attorney, Agent, or Firm—Jack E. Dominik

[57] ABSTRACT

A laminar flow system and removable animal rack is disclosed in which the housing which includes a blower, plenum chamber, and filter is fixedly secured to a support surface. The filter is open at at least one end, and a removable animal rack may be wheeled into position immediately adjacent the filter. The unit may be constructed with the filter recessed so that the end walls overlap a portion of the animal rack; or with a filter in the front wall and the rear wall, so that animal racks may be positioned at both the front and the rear of the housing. Optionally, extensions may be placed on the end walls to reduce end effect or eddy currents from the ambient air entering into the laminar flow as the same passes filtered air over cages contained in the animal racks. The proportions of the housing are greater than four to one for the ratio of the height to the depth, a height to width ratio of less than two to one, and a width to depth ratio of greater than three to one.

35 Claims, 11 Drawing Figures

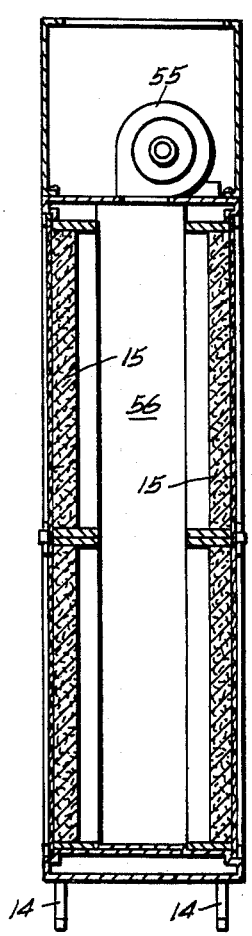
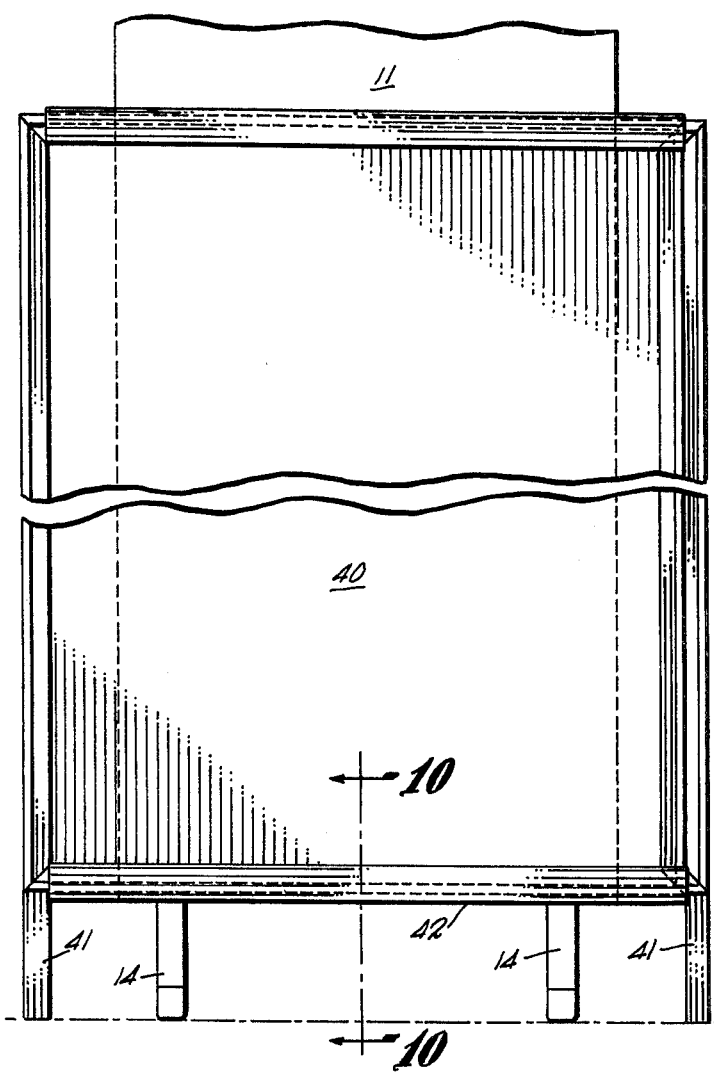
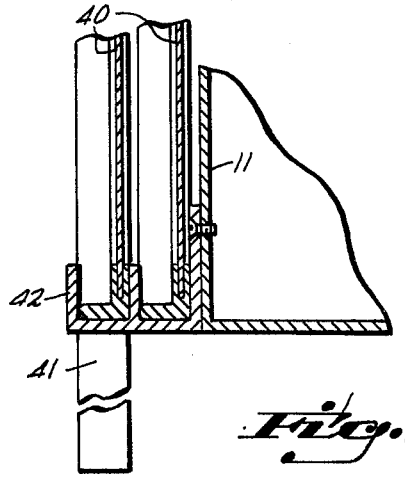
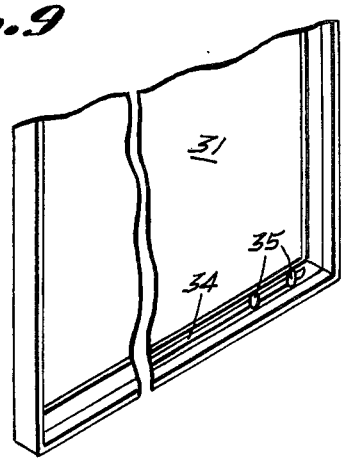
Fig. 8
Fig. 9
Fig. 10
Fig. 11

LAMINAR FLOW SYSTEM AND REMOVABLE ANIMAL RACK

BACKGROUND OF THE INVENTION

1. Field of the Invention

The present invention relates to the care, feeding, and experimentation with laboratory animals such as rats, rabbits and the like. More specifically, the field of invention is directed to laminar flow filters which provide a very high efficiency of removal of particular matter of the ambient air and pass the same through animal cages, the latter being positioned in cage racks. The purpose is to provide air for the animals as pure as possible, so that they will not be exposed to microorganisms which might produce a disease or affect the results of experiments. It is also to minimize the cross-contamination of germs from one animal to another.

2. Description of the Prior Art

The prior art is best described as contained in composite units having a filter, plenum, and blower to which a rack is permanently secured, with the air passing over the rack. The entire prior art unit is mobile, and placed upon casters or other means for moving the same.

The prior art units suffer from numerous disadvantages, not the least of which is precluding the animal rack from being moved to a separate cage washer or other place for cleaning, separate and independent of the filters which would be damaged by such cleaning. Furthermore, because the racks are secured to the filter system, there is a limitation in size of the prior art unit that can be passed through a standard door. In addition, units utilizing HEPA (High Efficiency Particulate Air) filters should not be moved about, since the seal around the filter and its host unit may be broken, and even small air holes can significantly disturb the overall filtration effect. Exemplary of the prior art is a unit known as the Carworth unit sold under the Trademark "STAY-Clean", previously a division of Becton, Dickinson & Company, of New York City, N.Y., the same being currently marketed by Lab Products, Inc. of Garfield, N.J. A further disadvantage of the prior art laminar flow cage racks is the reduced capacity in a given room to handle large numbers of animal cages, and a further reduced filter area.

Summary of the Invention

The present invention contemplates a laminar flow system and removable animal rack in which the system is semi-permanently mounted with the animal rack being transportable into direct laminar flow relationship with the filter of the system. The system comprises a vertical air circulation housing having imperforate end walls and an intake at the top. At least the front wall is essentially a filter. A plenum chamber is defined behind the filter, or behind a pair of opposed filters, where both the front and rear constitute a filtered surface. A blower is provided beneath the top wall in an airflow coupled relationship to the filter. The animal cage rack is transportable, as indicated to the front of a filter or the filters and is sealed thereto with a gasket of the character disclosed in letters U.S. Pat. No. 3,870,490, when standardized animal racks are employed. From a dimensional standpoint, optimally the height of the housing is four times the depth. The housing further has a height to width ratio of less than 2:1. Finally, the housing has a width to depth ratio of greater than 3:1. Utilizing these ratios, a maximization of total animal cages per unit can be achieved, and yet with a housing which will pass through a standard 36 inch door, and can be erected in a standard 8 foot room. Furthermore, the animal cage is separately transportable to a remote location for steam cleaning, washing and the like, without damage to the HEPA filter. Optionally, removable extensions can be provided on the end walls to tubularize the laminar flow and protect the same against the ambient eddy currents and end effect.

One of the principal objects of the present invention is to provide a laminar flow animal rack which provides an optimum amount of HEPA filtered air for several animal cages. A related object is to provide a central laminar flow system remaining stationary, while the racks can be easily removed to go to cage washers.

A more detailed object of the present invention is to provide a laminar flow animal rack with 6 foot wide by 5 foot high area of HEPA filtered air which accommodates 100 or more conventional mouse cages with a 30 square foot capacity.

An optional embodiment of the invention, a double laminar flow animal rack, can be serviced by one unit with the filters on the front wall and the rear wall, providing 60 square feet of HEPA filter, still within the confines of a unit which can be passed through a 36 inch door, into an 8 foot room. A related object of the present invention is to provide the maximum square footage of laminar air and animal cages available for a given price per cage and per square foot.

DESCRIPTION OF DRAWINGS

Further objects and advantages of the present invention will become apparent as the following description proceeds, taken in conjunction with the accompanying drawings in which:

FIG. 8 is a transverse sectional view of the unit shown in FIG. 4.

FIG. 9 is a broken end view showing the extensions on the end walls of the unit disclosed in FIG. 5.

FIG. 10 is a fragmentary sectional view from the line 10—10 in FIG. 9 showing how the extensions are attached to the end walls of the units.

FIG. 11 is a broken fragmentary perspective view showing an alternative to the dual track supports for the extensions as disclosed in FIGS. 9 and 10.

DESCRIPTION OF ILLUSTRATIVE EMBODIMENTS

As will be noted from the description of the drawings above, there are alternative embodiments of the present invention which contemplate the following:

I. A laminar flow system in which a single filter is employed, and the animal rack is recessed within the system against the filter.

II. A system having filters at both the front and the rear wall, thereby accommodating animal racks positioned at the front wall and the rear wall.

III. A single filter without the recess of embodiment I above.

IV. Any of the above systems in which the end walls are provided with extensions to thereby lengthen the area of laminar flow, thus reducing the tendency for eddy currents to enter the same, permitting longer animal cages, or animal cages in tandem, to be positioned on the animal cage racks.

Figure 1:
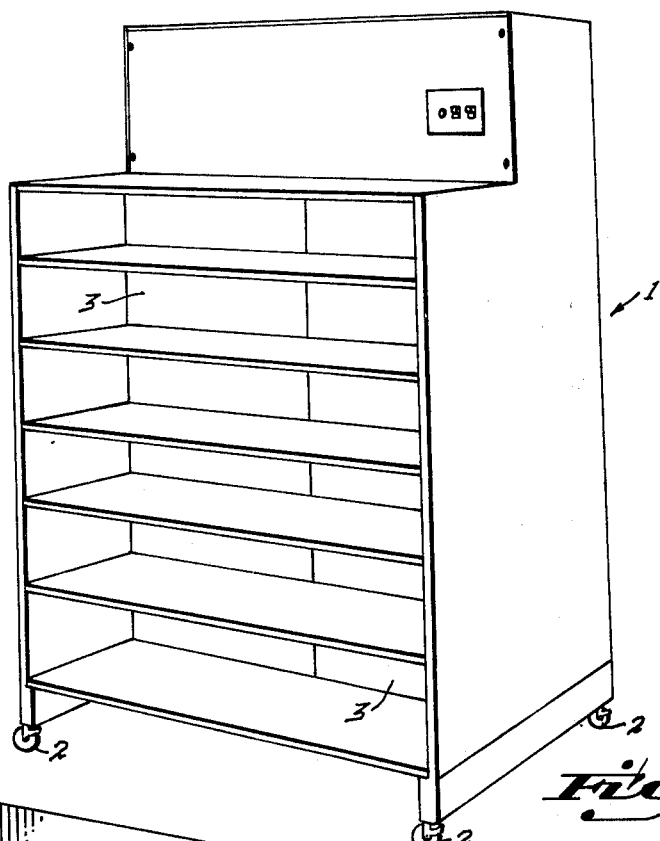
FIG. 1 is a perspective view of a typical prior art laminar flow animal cage, in which the rack and the filtered air system are unitary.

Initially, it should be noted that the prior art is exemplified in FIG. 1, where the prior art rack 1 is supported on casters 2. It is thus movable anyplace in the animal room. The filter 3 is provided at the rear portion of the cage rack 4, all of which are secured in unitary fashion. As pointed out above, there are two major disadvantages of such a unit:

1. The animal rack portion 4 cannot be taken to a separate cage washer or other location for cleaning, and 2. In moving the entire unit on wheels, it is possible to break the seal of the filter and thus inhibit the effectiveness of the filtering action.

A further disadvantage results from the height to depth ratio being such that a large unit cannot be moved in and out of a standard door. This limits the amount of filter space, attributable to the filters 3, and thus increases the inherent cost per square foot of filter.

Figure 2:
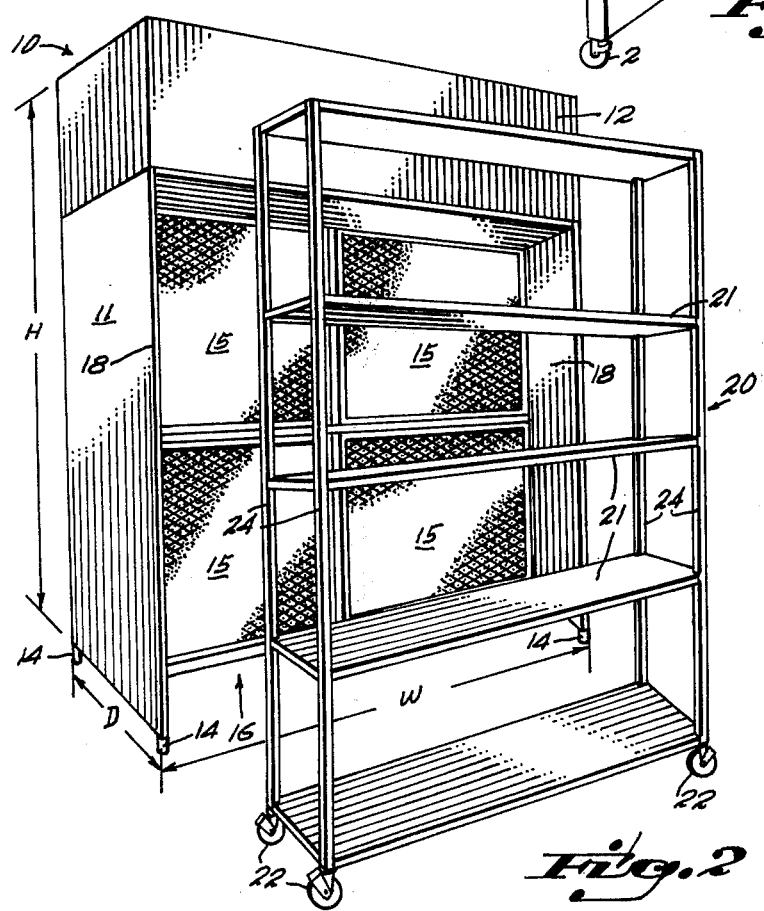
FIG. 2 is a perspective view of one embodiment of the present invention showing the animal rack in spaced removed relationship for insertion into a laminar flow chamber.

FIG. 2 shows a filter system 10 having end walls 11, and a front 12 which overlaps a rack recess 16 in front of a filter 15. The unit is supported on legs 14. As will be observed, an end wall extension 18 is provided beneath the front 12 and its overhanging portion, thereby defining a recess wherein the animal rack 20 can be positioned. Since many laboratories have pre-existing animal racks, by providing the recess 18 in an area in which laminar flow is present passing out of the filter 15, special purpose racks need not be provided for use in the system. To be observed also in FIG. 2 is the ratio of the height to depth, which is optimally 4:1 or greater. The ratio of the height to width is less than 2:1, and the width to depth ratio is greater than 3:1. With all of these dimensions, particulary where a 96 inch ceiling is involved, a unit of up to 90 plus inches in height may be passed through a standard door, and then erected in the room. Furthermore, the animal rack 20 may be separately put into the room, or separately removed for purposes of cleaning.

Figure 3:
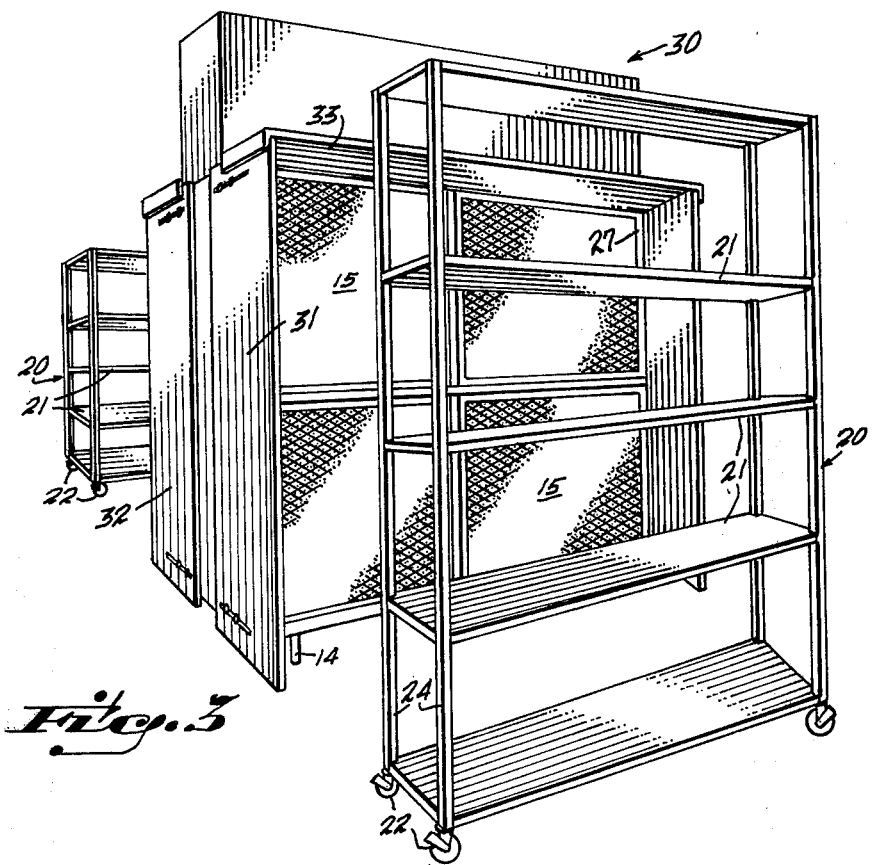
FIG. 3 shows an alternative embodiment, in which filters are provided on both the front and rear walls of the system and aniaml racks can be positioned on both sides of the filters.

The double filter embodiment 30, is shown in FIG. 3. There it will be seen that adjustable front extension 31 and adjustable rear extension 32 are provided with an optional cover 33, which can be placed over the extensions as shown. An animal rack can then be positioned in the front of the double filter unit 30 and in the rear. The animal racks are normally secured by shock cord, or clamps, into position so that as the animals jostle about in the cages, there will be no significant displacement of the relationship between the rack 20 and the filter system 10, 30. Gaskets 27 of the character disclosed in letters U.S. Pat. No. 3,870,490 are utilized about the periphery of the filters to seal standard sized racks to said filter periphery. To be noted also are the standard elements of the rack including a plurality of shelves 21, four corner posts 24, and rack wheels 22 at the bottom. This is to be distinguished from the construction of the filter system in which legs 14 are provided so that it is immobilized, and the filters 15 are not disturbed in their sealed relationship to the unit. As will be described in greater detail, the extensions 31, 32 are secured by means of bolts 35 and slots 34 in the extensions 31, 32. The cover 33 merely fits over the top in gravity relationship.

Figure 4:
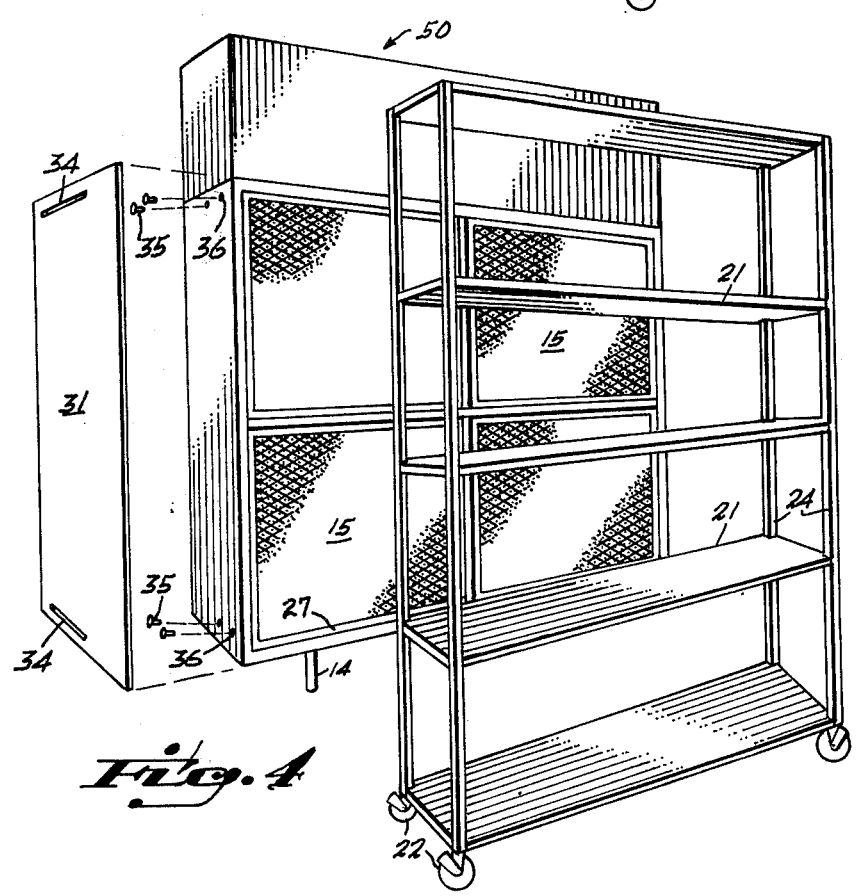
FIG. 4 shows still another alternative of the subject system in which the filter is not recessed as in the embodiment shown in FIG. 2.

Illustrative of the use of a single filter element with the extensions is the unit shown in FIG. 4. There it will be seen that the filter system 50 does not have an overhanging front 12 such as described in connection with FIG. 2, but rather provision is made for a single extension 31 to be secured by means of the bolts 35, track 34, to the bolt holes 36 in the ends 11 of the of the filter system 50. The animal cage 20 is then positioned in the same essential relationship to the filters 15 as with the other embodiments.

Figure 5:
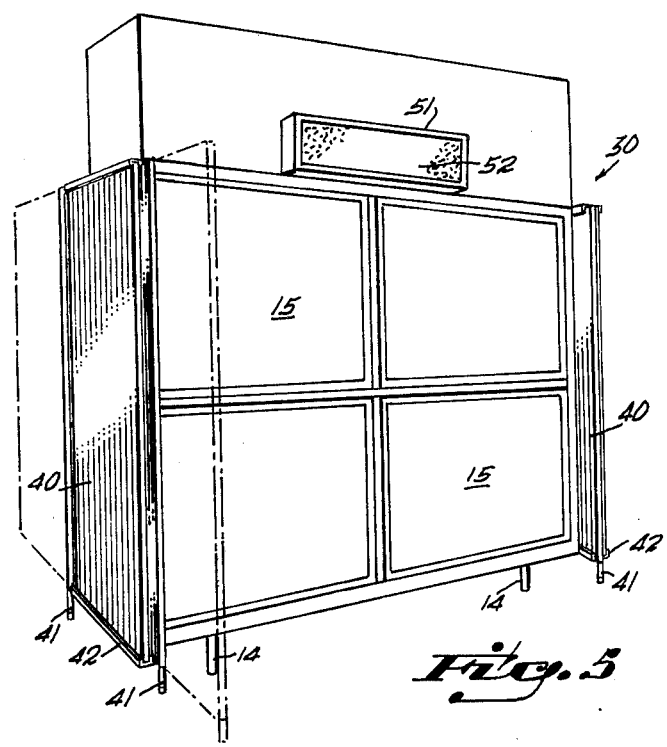
FIG. 5 shows the utilization of extensions flanking the laminar flow area which may be optionally employed.

In the unit shown in FIG. 5, also a double filter unit 30 an alternative construction of extensions 40 is shown. The extensions 40 slide in tracks 42, and are supported at their ends by means of extension legs 41. The specifics of the extensions 40 are shown in FIGS. 9 and 10 where it will be seen that the tracks 42 are double in thickness, and the two extensions are positioned side by side for sliding relationship with the end walls 11. In this configuration with the extensions 40, the length of the side walls at the two opposite ends can be varied. Furthermore, the extensions 40 can be removed for purposes of shipment, or washing, without the use of bolts and the like, Alternatively, as shown in FIG. 11 and described above, the pair of bolts riding in the slot 34 permit the utilization of adjustable extensions 31, 32 as described above.

Figure 6:
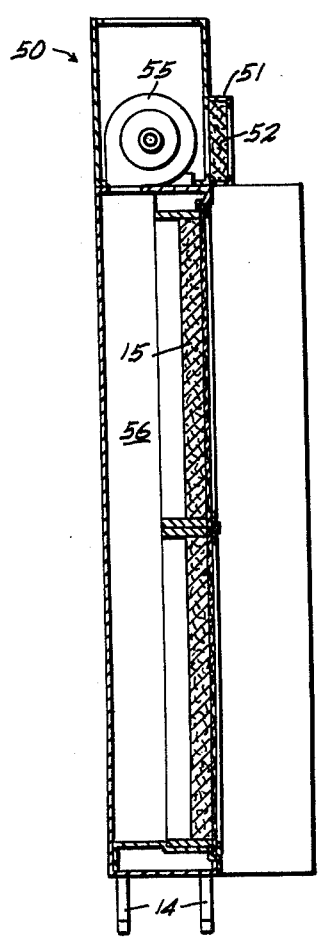
FIG. 6 is a transverse sectional view of the unit shown in FIG. 2.
Figure 7:
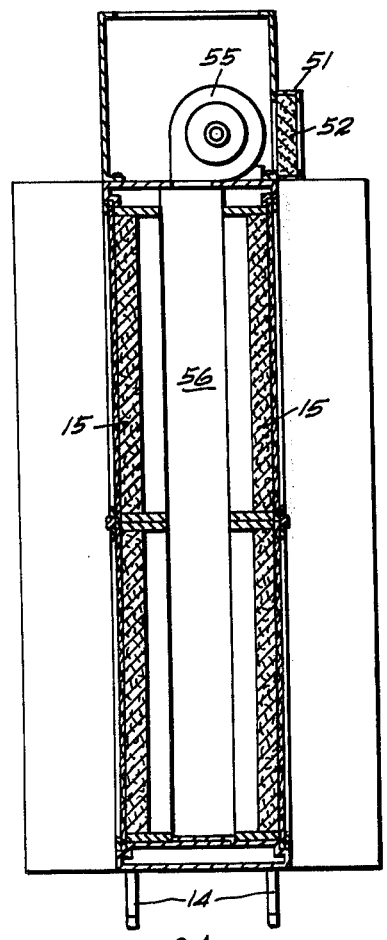
FIG. 7 is a transverse sectional view of the unit shown in FIG. 3.

Turning now to FIG. 6, it will be seen that the single filter system 50 as shown in FIG. 4, is provided with an extension 51 at the top into which a prefilter 52 is positioned. The prefilter is highly desirable in those situations where there is a large amount of litter in an animal room, such as attendant with chickens, so that the prefilter will capture the large particulate material prior to passing the air through the HEPA filter 15. In this fashion, the prefilter 52 may be replaced or cleaned as need dictates, and the HEPA filter 15 will last 15 for a considerable period of time. The blower 55 may be single or double, but feeds the plenum chamber 56 by blasting air downwardly. In the double filter configuration as shown in FIG. 7, it will be seen that the plenum feeds filters in both directions, whereas in the narrower unit of FIG. 6, in only one direction. Extensions 51 and prefilters 52 are shown in the embodiment in FIG. 5 as well. The unit shown in FIG. 8 is also a transverse section of the double filter, but illustrating the same without the sidewall extensions, intended for back-to-back relationship to animal racks.

In review, it will be seen that a variety of filter systems and animal racks have been shown and described. In each instance, the animal rack may be removed for washing and cleaning. In each instance, by preserving the height to depth and width to depth and height ratios, as set forth above, the same can maximize the size of unit to be taken into a animal room. The side wall extensions prevent splatter from the rack going into the room, and also inhibit eddy currents and stray currents of air from disturbing the laminar flow through the filters. Finally, with the double filter unit, a maximum amount of square footage of laminar flow can be provided for a minimized cost. With a five foot by six foot filter, some 60 square feet of filtered air is provided by the double unit, prefiltered as well.

In a commerical embodiment, the height, depth and width of the housing, including the top detachable extension, might well be 90 inches, 18 inches and 75 inches respectively, without regard to whether the unit is equipped with filters on both sides or on one side only. The detachable extension on top might well have a height of 18 inches. Said dimensions are not intended to limit the construction, but merely serve to illustrate the ability to build the unit so it will pass through a 36 inch standard door.

While the invention has been described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

What is claimed is:

1. A laminar flow system and removable animal cage racks comprising, in combination,
   a vertical air circulation housing having imperforate end walls,
   one front wall being essentially a filter,
   means defining a plenum chamber behind the filter,
   an opening in a top wall to admit ambient air,
   a blower beneath the top wall and in air flow coupled relationship to the filter,
   means for immovably mounting the housing on a support,
   an animal cage rack with transportable means for supporting the same in removable relationship to the filter,
   said housing being proportional to pass through a standard door and said rack having a depth permitting passage through a standard door
   whereby the entire assembly may be placed in an animal room and the rack removed for washing while the circulatory system remains in fixed position.

2. In the system of claim 1,
   an extension removably secured to the top of the vertical air circulation housing,
   said extension enveloping the blower in air flow coupled relationship to the plenum chamber,
   a prefiltering means removably secured to the extension, remote from the plenum chamber, and in air flow coupled relationship to the blower,
   said prefiltering means being positioned to permit servicing of the blower and blower power source when said prefiltering means is removed
   whereby the extension and elements interiorly mounted in said extension may be removed to permit the vertical air circulation housing to pass through low doorways and the like.

3. In the system of claim 1,
   means for removably securing the animal cage rack to the vertical air circulation housing to prevent animals within the cages from shifting the rack away from the proximity of the filter.

4. In the system of claim 3,
   means for sealing the animal cage rack to the vertical air circulation housing.

5. In the system of claim 1,
   said housing having a height to depth ratio of at least 4:1.

6. In the system of claim 1,
   said housing having a height to width ratio of less than 2:1.

7. In the system of claim 1,
   said housing having a width to depth ratio of greater than 3:1.

8. In the system of claim 1,
   filters on the front and rear wall defining a plenum chamber therebetween
   whereby removable animal racks may be placed against the front and rear walls.

9. In the system of claim 1,
   said filter being recessed whereby the end walls overlap the ends of the removable racks.

10. In the system of claim 1,
    removable extensions of said end walls to permit recessing of the rack against the filter.

11. In the system of claim 2,
    said housing having a height to depth ratio of at least 4:1.

12. In the system of claim 2,
    said housing having a height to width ratio of less than 2:1.

13. In the system of claim 2,
    said housing having a width to depth ratio of greater than 3:1.

14. In the system of claim 2,
    filters on the front and rear wall defining a plenum chamber therebetween
    whereby removable animal racks may be placed against the front and rear walls.

15. In the system of claim 2,
    said filter being recessed
    whereby the end walls overlap the ends of the removable racks.

16. In the system of claim 2,
    removable extensions of said end walls to permit recessing of the rack against the filter.

17. In the system of claim 6,
    said housing having a height to depth ratio of at least 4:1.

18. In the system of claim 7,
    said housing having a height to width ratio of less than 2:1.

19. In the system of claim 4,
    said housing having a width to depth ratio of greater than 3:1.

20. In the system of claim 1,
    said housing having a width to depth ratio of greater than 3:1,
    said housing having a height to width ratio of less than 2:1, and
    said housing having a height to depth ratio of at least 4:1.

21. In the system of claim 20,
    filters on the front and rear wall defining a plenum chamber therebetween
    whereby removable animal racks may be placed against the front and rear walls.

22. In the system of claim 21,
    means for sealing the animal cage rack to the vertical air circulation housing.

23. In the system of claim 20, said filter being recessed,
whereby the end walls overlap the ends of the removable racks.

24. In the system of claim 20,
removable extensions of said end walls to permit recessing of the rack against the filter.

25. A laminar flow system and removable animal cage racks comprising, in combination,
a vertical air circulation housing having imperforate end walls,
said laminar flow system having front wall portions and rear wall portions,
each of said front wall portions and rear wall portions being essentially a filter,
means defining a plenum chamber between said opposed front and rear wall filter portions,
a top joining the front wall, rear wall and end walls at an upper portion of the laminar flow system,
means defining an opening in the top wall to admit ambient air,
a blower positioned proximately beneath the top wall and in airflow coupled relationship to the opposed front and rear wall filter portions,
means for immovably mounting said airflow system on a support,
an animal cage rack with transportable means for supporting the same in removable relationship to the opposed filters and at opposite sides of the system, and adjacent to said filters,
said system and housing being proportioned to pass through a standard door, and
said racks having a depth permitting passage through a standard door,
whereby the entire assembly may be placed in an animal room and the racks removed for washing while the circulatory system remains in a fixed position, and whereby animal racks may be positioned opposite both the front wall and rear wall thereby maximizing the utilization of the air circulatory system and filtration system.

26. In the system of claim 25,
an extension removably secured to the top of the vertical air circulation housing,
said extension enveloping the blower in air flow coupled relationship to the plenum chamber,
a prefiltering means removably secured to the extension remote from the plenum chamber, and in air flow coupled relationship to the blower,
said prefiltering means being positioned to permit servicing of the blower and blower power source when said prefiltering means is removed
whereby the extension and elements interiorly mounted in said extension may be removed to permit the vertical air circulation housing to pass through low doorways and the like.

27. In the system of claim 25,
means for removably securing the animal cage rack to the vertical air circulation housing to prevent animals within the cages from shifting the rack away from the proximity of the filter.

28. In the system of claim 25,
means for sealing the animal cage rack to the vertical air circulation housing.

29. In the system of claim 25,
said housing having a height to depth ratio of at least 4:1.

30. In the system of claim 25,
said housing having a height to width ratio of less than 2:1.

31. In the system of claim 25,
said housing having a width to depth ratio of greater than 3:1.

32. In the system of claim 25,
said filter being recessed whereby the end walls overlap the ends of the removable racks.

33. In the system of claim 30,
said housing having a height to width ratio of less than 2:1.

34. In the system of claim 30,
said housing having a width to depth ratio of greater than 3:1.

35. In the system of claim 33,
said housing having a width to depth ratio of greater than 3:1.

* * * * *